United States Patent [19]

Torreiter et al.

[11] Patent Number: 5,742,616
[45] Date of Patent: Apr. 21, 1998

[54] SYSTEM AND METHOD TESTING COMPUTER MEMORIES

[75] Inventors: Otto Torreiter, Leinfelden-Echterdingen; Roland Metzger, Wimsheim; Dieter Wendel, Schonaich, all of Germany

[73] Assignee: International Business Machines Corporation, Armonk, N.Y.

[21] Appl. No.: 486,468

[22] Filed: Jun. 7, 1995

[30] Foreign Application Priority Data

Mar. 1, 1995 [EP] European Pat. Off. ............ 95100835

[51] Int. Cl.⁶ .................................................. G01R 31/28
[52] U.S. Cl. ...................... 371/22.4; 371/22.5; 371/22.6; 371/21.1; 395/183.06; 395/183.18
[58] Field of Search ................................. 371/22.6, 22.4, 371/22.3, 22.2, 21.2, 21.3, 22.5; 395/183.06, 183.18

[56] References Cited

U.S. PATENT DOCUMENTS

| | | | |
|---|---|---|---|
| 4,727,544 | 2/1988 | Brunner et al. | 371/21 |
| 4,816,656 | 3/1989 | Nakano et al. | 235/380 |
| 4,930,129 | 5/1990 | Takahira | 371/40.4 |
| 5,436,971 | 7/1995 | Armbrust et al. | 380/23 |

FOREIGN PATENT DOCUMENTS

| | | | |
|---|---|---|---|
| 0215464 | 9/1986 | European Pat. Off. | G11C 29/00 |
| 0505603 | 3/1991 | European Pat. Off. | G07F 7/10 |
| 0574990 | 6/1993 | European Pat. Off. | G07F 7/10 |
| 2191008 | 12/1987 | United Kingdom. | |

*Primary Examiner*—Hoa T. Nguyen
*Attorney, Agent, or Firm*—David N. Koffsky; Kenneth A. Seaman

[57] ABSTRACT

A self test circuit provides a general statement about the condition of a coupled memory which indicates whether a wanted or unwanted manipulation or alteration of the memory has occurred. The contents of the memory are not derivable from the general statement. The general statement is preferably a "fail" or "pass" statement stating whether a deviation in the contents of the memory with respect to a last executed test has been detected or not. The testing of a non-volatile memory is executed by generating a signature from the contents of the non-volatile memory and comparing the generated signature with a reference value of the signature. When the comparison of the generated signature with the reference value indicates a different, a signal is issued and access to the non-volatile memory is restricted and/or a failure procedure is started. Access to the non-volatile memory is allowed when the comparison signature with the reference value indicates no difference. In order to allow a test of whether an alteration of the contents of the non-volatile memory has happened between successive authorized applications, a new signature from the contents of the non-volatile memory is generated after each application and stored as a new reference value.

14 Claims, 2 Drawing Sheets

SYSTEM AND METHOD TESTING COMPUTER MEMORIES

FIELD OF THE INVENTION

The invention relates to memory self-test circuit, particularly for portable microcomputers configured in the form of chip cards.

BACKGROUND OF THE INVENTION

Memories are used in a variety of applications and require a certain security features in order to prevent unauthorized access or manipulations thereof.

Portable microcomputers, for example configured in an intelligent chip card, have recently become important and require sophisticated security features to prevent unauthorized access, especially to their memories. In presently used chip cards that include a microcomputer (e.g. multi function cards (MFC's) for cashless payment or telephone cards), certain functional units are to be kept inaccessible after chip production and wafer test. One way to restrict access to the functional units is by employing a personal identification number (PIN) which only allows access to the microcomputer when the correct PIN has been entered.

FIG. 1 shows a basic structure of a microcomputer 5 as known in the art. A logic block 10, which comprises a microprocessor, is connectable via a user I/O port 15 and a user I/O terminal 20 to the world outside of microcomputer 5. Microcomputer 5 further comprises a memory block 25 which usually contains a volatile memory 30 and non-volatile memories 40. The non-volatile memories 40, in general, employ an erasable memory 50 (such as an electrically erasable and programmable memory EEPROM) and a non-erasable memory 60 (such as a read only memory ROM).

In certain applications, e.g. for security reasons, memory block 25 is not directly accessible from logic block 10 but only through a security logic 70 connecting logic block 10 and various memories 30 and 40 in memory block 25. Security logic 70 controls, manages and addresses memory block 25 independently from logic block 10. When the logic block issues a read or write request to memory block 25, security logic 70 interprets that request and addresses the respective memory cells. However, logic block 10 only sends a word to be stored or receives a word read from memory block 25 but does not know the location where the respective word is stored to or read from. However, it is to be understood that security logic 70 provides an optional security feature for applications with a high security demand, but is not an essential feature for microcomputer 5.

A data bus 75 couples logic block 10 and memory block 25 via optional security logic 70. Apart from user I/O terminal 20, a microcomputer 5 for chip card applications usually comprises a test I/O terminal 80 connected to the security logic block 70. In order to keep certain functional units inaccessible after production and initial test of microcomputer 5, test I/O terminal 80 includes hardware fuses 90 which can be blown, preferably immediately after wafer test, so that the microcomputer 5 afterwards is only accessible via user I/O terminal 20. However, all units within microcomputer 5 are fully accessible before the blowing of fuses 90.

Test I/O terminal 80 allows a bypass of security logic 70 (before fuses 90 are blown) in order to directly address memory block 25. However bypassing of security logic 70 for test purposes is only allowed before actual usage of microcomputer 5. When microcomputer 5 is to delivered to a customer, fuses 90 are blown so that memories 30 and 40 of memory block 25 are only accessible through security logic 70. Security logic 70, however, only allows limited access to memory block 25 and sufficient testing of microcomputer 5 cannot be achieved. Testing and fault diagnosis of returned chip cards is therefore either very difficult or even impossible to accomplish. That means that, for example, when a customer suspects a malfunction of his card, the card cannot be inspected by simply testing functional units, such as the memory block 25. On the other hand, a manipulation of the card is difficult to detect by card dispensing institutes.

The functioning of security logic 70 and methods for preventing a manipulating access of protected units (e.g. by selectively locking the writing access to areas of an EEPROM) are generally kept secret. However, it is apparent that all presently used protective mechanisms basically isolate the protected units from the user interface (e.g., user I/O port 15). A direct intrusion into areas of memory block 25, e.g. by purposely charging or discharging the storage cells in the erasable memory (EEPROM) 50 by means of a charge carrier implantation with an electron-beam technique etc., can, however, not be avoided. Accordingly, an unwanted variation of the contents of the memory cells in memory block 25 due to defects which, for example, are first exhibited after a certain intermission time between successive writing accesses ('Retention Time Defects'), or due to unwanted defects caused by electro-magnetic fields or radiation, can hardly be reconstructed.

In particular, non-volatile memories 40 appear to be especially fault sensitive. Generally, ROM 60 contains invariable program codes and data in the form of constants. EEPROM 50 contains variable and invariable data such as the state of an account, code numbers or the like, so that a special protection against manipulation is required. ROM 60 is therefore fault sensitive only with respect to a manipulating intrusion, whereas the EEPROM 50 is fault sensitive with respect to defects occurring and also with respect to a manipulating intrusion into the memories.

EP-A-0 505 603 discloses a basic concept for the testing of re-writable memory areas through use of write and read events with an emphasis on test time reduction. A test command with a test data word and an address is transmitted to the memory. The memory contains a tester which extracts a necessary test data bit for a protected memory from the test data word. The test of the memories can be executed in blocks or as a checkerboard test.

EP-A-0 574 990 discloses a test process for portable chip cards which is executed by means of a card terminal. The test process prevents an unauthorized multiplexing of an additional memory. A test word is determined in both a chip and a terminal by means of a secret algorithm and with reference to the contents of the chip memories. The test words are then compared with each other. The test word is to be determined for every application so that faults or a manipulation on the card between successive applications of the card cannot be detected.

U.S. Pat. No. 4,930,129 discloses an IC card having an error checking capability which operates within the card and without the need for the processing power of the terminal. The IC card has an onboard memory and an onboard microprocessor. The onboard memory contains a plurality of application blocks to which access is selectively allowed by the microprocessor and a protected block which is accessible by the microprocessor but inaccessible by the terminal. Stored within the protected block are data specifying the location, size and application associated with each of the application blocks, as well as an error check code relating to the data when stored within the application block.

The microprocessor disclosed in U.S. Pat. No. 4,930,129 is involved in the testing of the memory areas and thus requires a certain knowledge of corresponding code in the memory areas. Furthermore, the testing is limited on so-called application blocks so that a ROM and the protected blocks are not testable. That means that especially sensitive areas (ROM and protected blocks) where the actual testing program is stored, cannot be tested, so that a fault or manipulation therein cannot be detected. As a consequence, defective code in the testing program will not be recognized so the program might be executed defectively or even bypassed. In other words even correct testing of the application blocks is uncertain. Another problem is that the data contained in the application blocks must be available for the processor as transparent data, so that an unrestricted read access must be possible. The testing thus requires knowledge of the contents of the memory. However, for certain applications wherein data has to be stored in protected blocks, these data cannot be tested with the disclosed method.

It is an object of the invention to provide a method and an apparatus which allows a testing of memories, particularly in microcomputers.

SUMMARY OF THE INVENTION

Self test circuitry according to the invention provides a general statement about the condition of a coupled memory, whereby the general statement indicates a wanted or unwanted manipulation or alteration within the memory. The contents of the memory or parts of it are not derivable from the generated statement. The general statement is preferably a "fail" or "pass" statement stating whether a deviation has been detected in the contents of the memory with respect to the last executed testing.

The self test circuitry in a preferred embodiment of the invention comprises a signature generating means which generates a signature from the contents of the memory, and a comparator for comparing the generated signature with a reference value of the signature and which issues at least one signal indicative of whether the generated signature and the reference value concur.

The self test circuitry is preferably embodied in a computer system or a portable microcomputer (such as a chip card), comprising the memory to be tested, a processor and, optionally, security logic which restricts an access to the memory, so that the processor only receives information about the condition of the memory by means of the self test circuitry.

The testing of a non-volatile memory is executed by generating a signature from the contents of a non-volatile memory and comparing the generated signature with a reference value of the signature.

In an embodiment of the invention, when the comparison of the generated signature with the reference value of the signature indicates a difference, a signal is issued and access to the non-volatile memory is restricted and/or a failure procedure is started. Access to the non-volatile memory is allowed when the comparison of the generated signature with the reference value of the signature indicates no difference.

In order to allow a testing of whether an alteration of the contents of the non-volatile memory has happened between successive authorized applications, a new signature from the contents of the non-volatile memory is generated after each application and stored as a new reference value of the signature.

The generation of a signature from the contents of the non-volatile memory can be effected by sequentially reading out the contents of the non-volatile memory, combining the first read-out sequence with a start sequence and combining each successive read-out sequence with the result of the preceding combination, whereby the last combination represents the signature of the non-volatile memory. Alternatively, the generation of a signature can be executed by adding digits representing the contents of the respective memory cells, thus forming the sum of digits (a check-sum) representing the signature of the non-volatile memory, or at least of a part of it.

The invention provides, e.g. in a microcomputer such as a chip card, enhanced self test logic as an additional circuit which can be kept inaccessible from outside of the microcomputer. After executing the self test of the memories in the microcomputer, the self test logic supplies a general statement about the condition of the memories, preferably a simple pass/fail result, however no information relating to the contents of the memories is given. The pass/fail statement can eventually be evaluated by the card terminal or can lead to a chip internal reaction such as a refusal of further access or issuing a fault signal. The microcomputer thus allows a recognition of wanted or unwanted changes or manipulations within the memories of the microcomputer and that respective actions will be executed independently.

The self-test circuitry of the present invention can be used in applications with a high demand on security and provides a reliable testing of the memories without destroying, or the need for removing, the contents of the memories. The self-test circuitry allows a complete separation of the memories from the processing units, such as the processor, in a way that the memories are not directly addressable or accessible for processing units. However, the processing units receive information from the self-test circuitry indicating whether a variation of the contents of the memories has been detected so that a fault analysis and diagnosis of the memories can be started.

BRIEF DESCRIPTION OF THE DRAWINGS

The invention will now be described by way of example and with reference to the accompanying drawings wherein.

DETAILED DESCRIPTION OF THE PREFERRED EMBODIMENT

While the invention will be explained with respect to a memory self-tester in a microcomputer configured within a chip card, the invention is not limited thereto.

Figure 1:
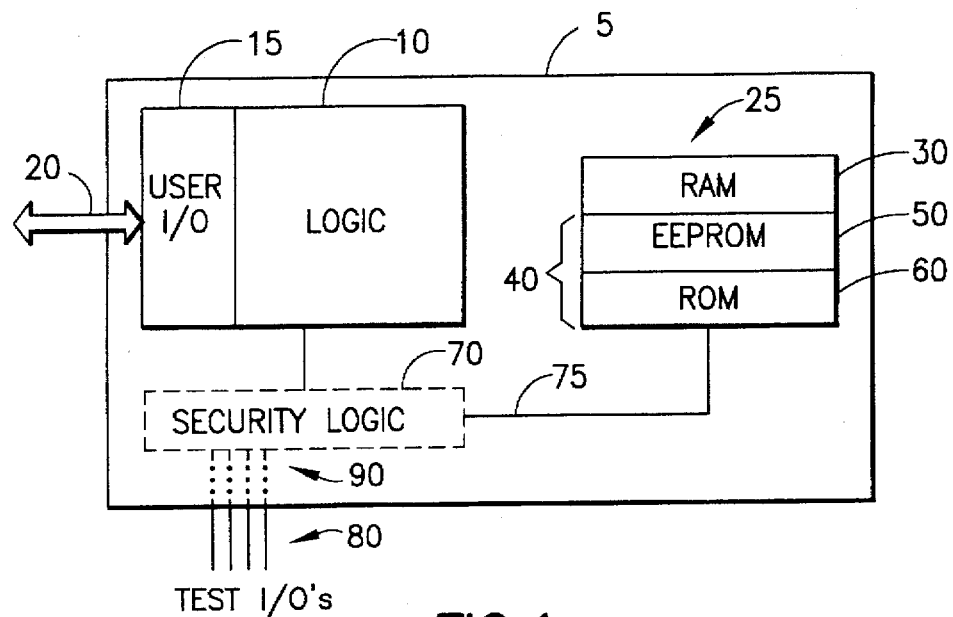
FIG. 1 shows a basic structure of a microcomputer as known in the art.
Figure 2:
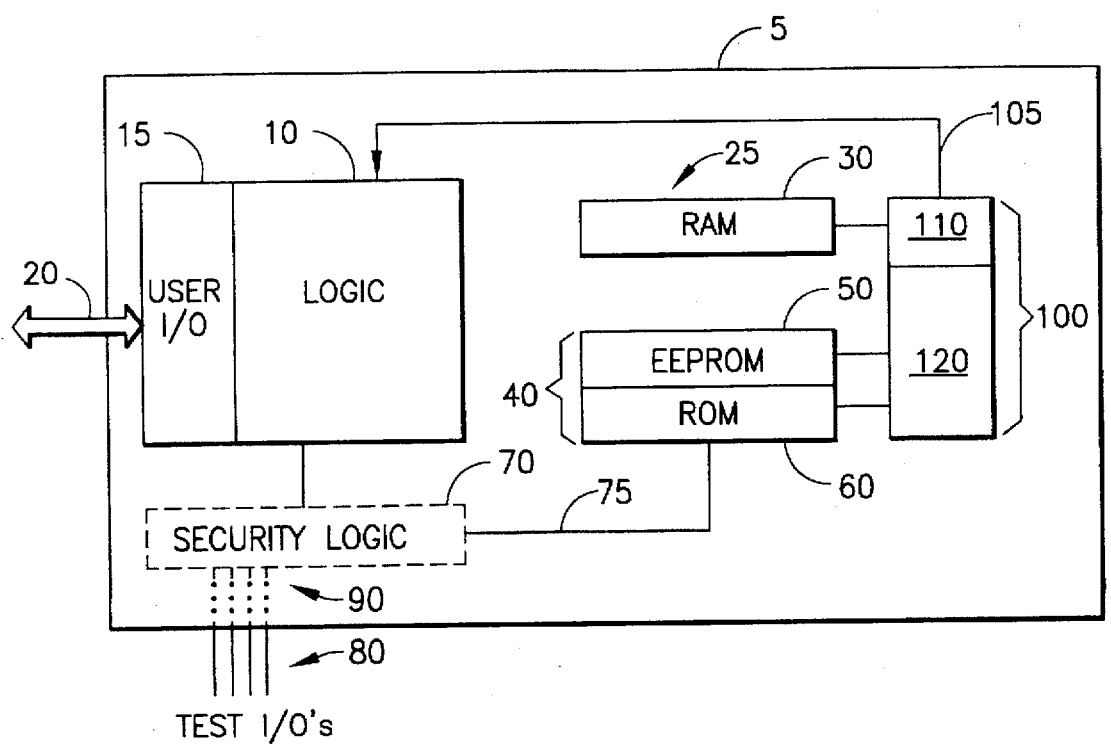
FIG. 2 shows an embodiment of a microcomputer according to the invention with additional self test circuitry.

FIG. 2 shows an embodiment of a microcomputer 5 according to the invention which is based on the fundamental structure of the microprocessor as given in FIG. 1, however, with additional self test circuitry 100. Self test circuitry 100 is coupled between memory blocks 25 and logic circuit 10. Self test circuitry 100 is not directly controllable by logic circuit 10, but only issues—when required—a general statement about the condition of the memory block 25 on line 105 to logic circuit 10. In other words, self test circuitry 100 does not provide any data to logic circuit 10 which refers to the contents in memory block 25, and thus enables no conclusions to be drawn about the contents of memory block 25. Preferably, self test circuitry 100 supplies a simple pass/fail statement to logic circuit 10, only stating whether a deviation from a last executed test has been detected or not.

In a preferred embodiment of the invention, self test circuitry 100 comprises a volatile memory tester 110 coupled to volatile memory 30 and a non-volatile memory tester 120 connected to non-volatile memories 40. Volatile memory tester 110 tests volatile memory 30 whereas non-volatile memory tester 120 tests non-volatile memories 40.

The contents of volatile memory 30 are destroyed on removal of power to volatile memory 30, so that no data can be stored therein between successive operation cycles of the microcomputer 5 (in case volatile memory 30 is not backed up by a temporary battery power supply). The testing of volatile memory 30, executed by volatile memory tester 110, can therefore be limited to testing of correct functioning of this device. Volatile memory tester 110 is preferably embodied as an array built-in self test (ABIST) as known in the art. Volatile memory tester 110 can also be tested by a microprocessor within logic circuit 10, using a memory test algorithm stored as micro-code within non-volatile memories 40.

The contents of non-volatile memories 40, in contrast to volatile memory 30, are not lost when power to the memories is removed. That means that, apart from a testing of the correct functioning of non-volatile memories 40, a further inspection of the actual contents is required to be performed by non-volatile memory tester 120. However, the contents of non-volatile memories 40 must not be changed during the testing so that the stored information is not lost.

In certain applications, only variations within the contents of the memory cells are of interest, so that a testing of the correct functioning of the non-volatile memories 40 is not required. As long as an alteration of a particular cell is not requested and the contents thereof will not change, the actual functioning of the cell (i.e., if the cell is still able to alter its value or not) is not of importance and needs therefore not to be tested. However, when the actual functioning of non-volatile memories 40 is of interest, function tests can be performed by any memory testing method known in the art and executed by non-volatile memory tester 120. However, the contents of the respective memory to be tested have to be maintained (e.g. in RAM 30).

For inspection of the actual contents, non-volatile memory tester 120 generates a signature of the entire contents of non-volatile memories 40. A signature analysis, in general, means a method of determining a fault in a digital system by input of test sequences of binary digits and inspection of the resulting output sequences (signatures) of binary digits. The generation of a signature from a memory therefore means receiving a value—the signature—derived from the contents of that memory. As the signature does not necessarily represent the contents, the contents of that memory, in return, cannot be derived from that signature. For the purpose of increased security, the signature is generated by using particular address sequences and coding methods.

An example for the generation of a signature of the contents of the memory blocks 25 is the adding of digits representing the contents of the respective memory cells, thus forming the sum of digits (a check-sum) of non-volatile memories 40, or at least parts of it. The check-sum can be derived by adding the contents in non-volatile memories 40 e.g. row by row, line by line, from each respective word-line, from respective odd and even addresses, or from other combinations. It is to be understood that there are various possibilities for deriving the signature.

A more complex and thus more secure solution for the generation of a signature of the contents of the memory blocks 25 in the non-volatile memory tester 120 will be given in FIG 4 and explained.

To increase security, further features such as the individual PIN number of the microcomputer 5 can be included and implemented in the determination of the signature. As an example, the personal identification number (PIN) of the chip card, which is generally only known to the card holder, can serve as a start value and/or is added to the summation check of the memory contents.

The determined signature, which is independent of the contents of the memory cells, is eventually compared with a pre-determined reference value. Self test circuitry 100 then issues a general statement about the condition of the memory block 25, preferably a simple pass/fail statement, derived from that comparison. That means, when no deviation from the last executed test of non-volatile memories 40 has been detected, or in other words, when the signature and the reference value coincide, self test circuitry 100 issues a 'pass' statement and a requested service of microcomputer 5 can start. When a deviation from the last executed test of non-volatile memories 40 is detected, or in other words, when the signature and the reference value do not coincide, self test circuitry 100 issues a 'fail' statement. In that case, it has to be specified which actions are to be performed and if the requested service of microcomputer 5 is to be allowed to start.

In general, the contents of non-volatile memory 40 are not steady and are usually changed during an application. Also, if further features (e.g. the PIN number) are implemented in the determination of the signature, the signature can vary. The reference value therefore needs to be variable and is preferably stored in a part of non-volatile memory 40 which is re-writable. Since a manipulation of the reference signature value, which can be encrypted several times, is very unlikely (e.g. for the purpose of an unauthorized access), the reference value can be preferably stored in a part 130 of erasable memory 50. This part 130 is then stored in the determination of the signature.

The contents in erasable memory 50 from non-volatile memory 40 are usually changed with every new application of microcomputer 5. This is due to a writing or reading of data during an application, for example when a new balance of an account as a result of a banking transaction has to be stored. Thus, a new reference value for the signature is to be determined after each application.

Figure 3:
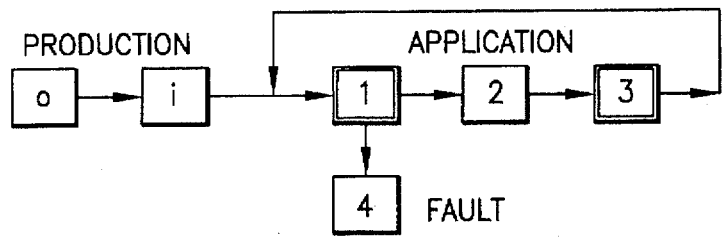
FIG. 3 shows a general state diagram of an application of the microcomputer of FIG. 2 comprising a self-test of the memory blocks.

FIG. 3 shows a general state diagram of an application of microcomputer 5, comprising a self-test of memory blocks 25. State 0 shows microcomputer 5 immediately after wafer test. The functioning of all parts including memory blocks 25 and also of self test circuitry 100 is insured by a complete testing of microcomputer 5. In state i, the initializing of the microcomputer 5 is executed comprising the programming of starting values for specific applications, the programming of a code number (e.g. the pin number) and a corresponding "first" reference value for the signature. The microcomputer 5 can then be handed to the customer in a fully operating condition.

States 1, 2 and 3 show the course of an application of microcomputer 5, for example carried out by the customer at a card terminal. In state 1, a starting examination of microcomputer 5 is executed and a signature from the contents of non-volatile memories 40 is determined. When a concurrence of a newly generated signature with the stored reference value of the signature is found, microcomputer 5 moves to state 2. State 2 represents the execution of the actual application by microcomputer 5 whereby, normally, the contents of non-volatile memory 40 are changed. When the actual application of state 2 is terminated, microcomputer 5 moves to state 3 in which the signature of the presently valid contents of non-volatile memories 40 is determined and stored, e.g. in part 130. Microcomputer 5 is then ready for a next application which starts from state 1.

If in state 1, the comparison between the presently determined signature and the stored reference value of the signature indicates a difference between those values, microcomputer 5 moves from state 1 to state 4. State 4 indicates that a fault has been recognized by microcomputer 5 and that a fault procedure has to be started.

States 2 and 3 are only accessible when no fault has been detected in state 1. The state diagram of FIG. 3 shows that microcomputer 5 is "internally locked" immediately after production and its initialization (state i). Each variation of the stored programs or data (e.g. due to defects or an unauthorized manipulation) is automatically determined by microcomputer 5. Damage resulting from a determined fault are avoided by the transition of microcomputer 5 from state 1 to state 4, representing a state wherein a fault procedure is executed.

In addition to an increase of security in the handling of microcomputer 5, the testability (even in a functional test) is perceptibly increased by the method and apparatus according to the invention. Even functioning units which are kept inaccessible from outside are completely testable without restricting the necessary requirements of security for the handling of (portable) microcomputers (such as microcomputer 5).

It will be appreciated by those skilled in the art that when an error happens within the self testing circuitry 100, a faulty signature will be determined so that microcomputer 5 will also be transferred automatically from state 1 to state 4.

Figure 4:
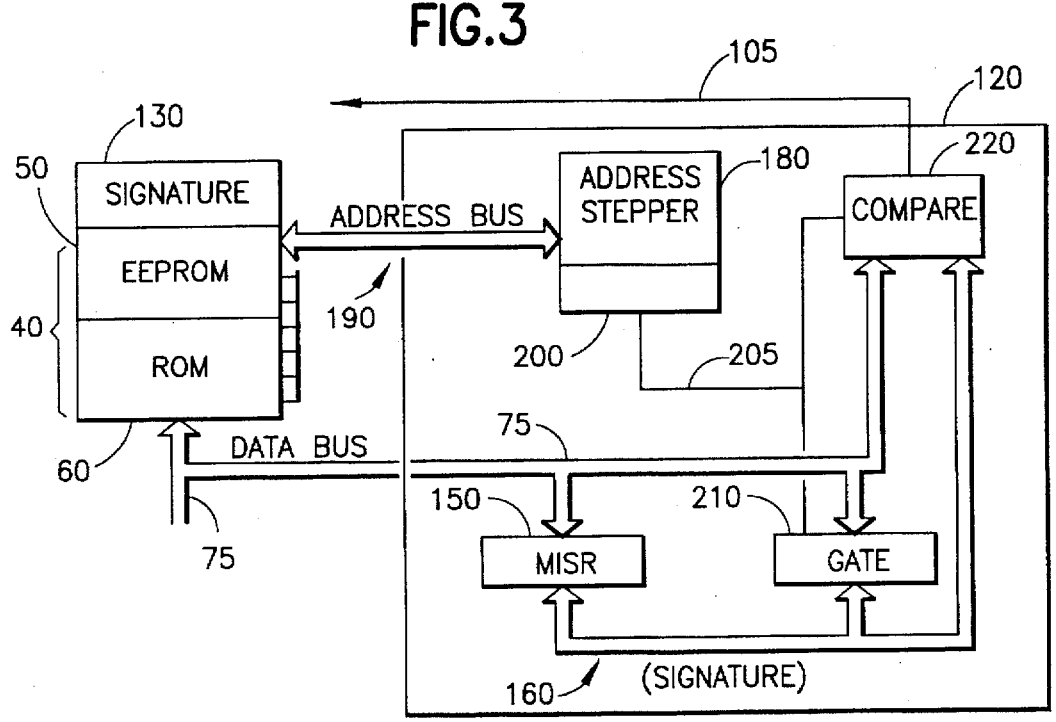
FIG 4 shows a preferred embodiment of the non-volatile memory tester.

FIG. 4 shows a complex and thus highly secure solution for the generation of a signature of the contents of memory blocks 25 as a preferred embodiment of non-volatile memory tester 120. Non-volatile memory tester 120 comprises a multiple input shift register (MISR) 150 connected via a data bus 75 to non-volatile memories 40 and having an MISR output bus 160. Non-volatile memory tester 120 further comprises an address stepper 180 connected via an address bus 190 to non-volatile memories 40, and a control unit 200 of address stepper 180 which is connected via control lines 205 to a write gate 210 and a compare unit 220. Both, write gate 210 and compare unit 220 are also connected with data bus 75 and with MISR output bus 160.

The general function of non-volatile memory tester 120 of FIG. 4 will now be explained with respect to the state diagram of FIG. 3. However, it is to be understood that modifications of that function depend on the chosen sequence of states. As explained above, before microcomputer 5 starts any application, a reference signature stored in part 130 of non-volatile memories 40 is compared with a signature to be determined, which represents the present condition of non-volatile memories 40.

The determination of the present signature is executed by causing address stepper 180 to sequentially address all locations within the non-volatile memories 40. The corresponding data are output, row by row and preferably in parallel, onto the data bus 75 and hence applied to MISR 150. MISR 150 generates a signature from the applied data on address bus 75 by respectively combining each row, read from non-volatile memories 40, with the result of the previous combinations of the previous rows. That means that the first row is combined with a starting value by using any possible logic function. The result thereof is then combined with the successive row using the same logic function and so on. The final result, which represents the signature of all the contents of non-volatile memories 40, is eventually placed on MISR output line 160. Comparator 220 then compares the determined signature on MISR output line 160 with the reference value of the signature applied on data bus 75. Dependent on whether the determined signature corresponds to the reference value, a pass or a fail signal is issued on line 105 to logic block 10.

After an application in state 2 of FIG. 3 has been terminated, microcomputer 5 enters state 3 wherein a new reference value of the signature is generated and stored. This is executed by again determining a signature from the present contents of the non-volatile memories 40 as described above. When the signature has been generated from all the present contents of non-volatile memories 40, the control unit 200 of the address stepper 180 opens write gate 210 to data bus 75 and the newly generated signature can be written into part 130 and stored therein.

In the embodiment of FIG. 4 it is almost impossible and very unlikely that a manipulation within the contents of the non-volatile memories 40 will result in the same signature, and furthermore, the signature is automatically encrypted. This provides a much higher security, for example with respect to the simple determination of the check-sum test. In the check-sum test a manipulation of two bits in the same bit position within different memory locations would result in the same value of the signature.

Figure 5:
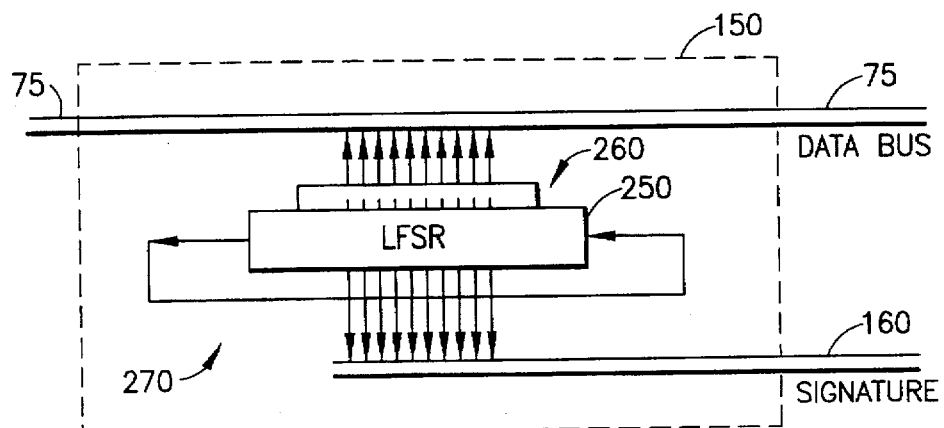
FIG. 5 shows an embodiment of the multiple input shift register (MISR).

It is to be understood that various embodiments of the MISR 150 are possible. FIG. 5 shows an embodiment of multiple input shift register (MISR) 150 comprising a linear feedback shift register (LFSR) 250 which is an n-bit clockable register. The LFSR 250 receives data in parallel from data bus 75 and an output thereof, also in parallel, is placed on MISR output line 160. LFSR 250 comprises a boolean network 260 combining the respective n bit lines of data bus 75 and the contents of the respective bit cell within LFSR 250 using a boolean function. Such a boolean function could be an AND, OR, EXCLUSIVE-OR or an INVERTER or any other more complex boolean function derived from that basic functions.

LFSR 250 in another embodiment further comprises a feedback line 270 which allows a shifting or rotating of the contents of LFSR 250, bit by bit. That means that the contents within LFSR 250 can be shifted or rotated to other positions within LFSR 250 before each bit is afterwards combined with data on data bus 75. As an example, the first row is combined with a starting value by any possible logic function, e.g. an XOR-function. The result thereof is then first rotated by one position and combined with the succeeding row using the same logic function, and so on.

As a further increase of security, as well as the boolean function, the number of positions shifted or rotated within LFSR 250 can be varied e.g. in an additional state 2' every time after the test in state 1 of FIG. 3 has successfully been carried out.

It is to be understood that the memory self-tester as disclosed herein is not limited to microcomputers, but can be applied to any computer system wherein the testing of a non-volatile memory is required, particularly when the testing result should not refer to the contents of that memory.

It is also to be understood that a computer system as represented by microcomputer 5 needs not necessarily be one separate unit, but can also be assembled from a plurality of separate units, e.g. one representing the processor in the logic circuit 10, one the memory block 40 and one the self-tester 100. Particularly with respect to non-intelligent chip card applications, whereby the chip card does not include a processor, the fundamental structure as given in FIG. 2 is not to be understood as limited to one separate unit.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A self test apparatus comprising:

processor means;

a memory comprising a non-volatile memory and an erasable memory;

self test circuit means coupled to said memory and said processor means, for testing a condition of said memory and issuing to said processor means a general statement about the condition of said memory, said general statement indicating a presence of a wanted or unwanted manipulation or alteration within said memory, said general statement including insufficient information to enable contents of said memory to be derived, but stating whether a deviation has been detected in the contents of said memory with respect to a last executed test; and the self test circuit means including a non-volatile memory tester which includes: signature generating means, operable after each authorized access to said non-volatile memory, for generating a signature from contents of the non-volatile memory, and a comparator for comparing the signature from said signature generating means with a reference value of the signature, and for issuing at least one signal indicating whether the signature and the reference value concur.

2. The self test apparatus as recited in claim 1, further comprising:

security logic means restricting access to the memory, whereby said processor only receives information about said condition of the memory by means of the self test circuit.

3. A method for testing a non-volatile memory, comprising the steps of:

(a) generating a signature value from contents of the non-volatile memory;

(b) comparing the signature value with a reference signature value;

(c) issuing a signal when the comparing of step (b) indicates a difference between compared values;

(d) restricting an access to the non-volatile memory when the comparing of step (b) indicates a difference between the compared values;

(e) allowing an access to the non-volatile memory when the comparing of step (b) indicates no difference between the compared values;

(f) generating a new signature from the contents of the non-volatile memory; and (g) storing the new signature of step (e) as a new signature reference value.

4. A computer system comprising a memory, a self test circuitry coupled to the memory and means coupled to the self-test circuitry for generating condition statement of said memory, said condition statement indicating whether data stored in said memory has been altered but not the content of the memory; and said generating means including security logic restricting access to contents of said memory, whereby only information about the condition of said memory is transmitted.

5. A self test apparatus comprising:

processor means;

a memory which comprises a non-volatile memory and an erasable memory; and self-test circuit means coupled to said memory and said processor means, for testing a condition of said memory and issuing to said processor means a general statement about the condition of said memory, said general statement indicating a presence of a wanted or unwanted manipulation or alteration within said memory, said general statement including insufficient information to enable contents of said memory to be derived and comprises a non-volatile memory tester which includes:

signature generating means for systematically generating a signature from contents of the non-volatile memory after operations thereof; and a comparator for comparing a signature from said signature generating means with a reference value of the signature, and for issuing at least one signal indicating whether the signature and the reference value concur.

6. The self test apparatus as recited in claim 5, wherein the non-volatile memory tester further comprises:

an address stepper for sequentially applying the contents of the non-volatile memory to the signature generating means; and signature storing means for storing a presently generated signature as a next reference value.

7. The self test apparatus as recited in claim 5, wherein the signature generating means further comprises:

register means; and a boolean network for sequentially combining the contents of said non-volatile memory with contents of said register means to derive a respective boolean function of said contents.

8. A method for testing a non-volatile memory, comprising the steps of:

(a) periodically generating a signature value from contents of the non-volatile memory;

(b) comparing the signature value with a reference signature value;

(c) issuing a signal when the comparing step indicates a difference between compared values;

(d) allowing an access to the non-volatile memory when the comparing step indicates no difference between the compared values;

(e) generating a new signature from the contents of the non-volatile memory; and (f) storing the new signature of step (e) as a new signature reference value.

9. The method according to claim 8, further comprising the step of:

(d) starting a failure recovery procedure.

10. The method according to claim 8, wherein step (a) of generating a signature from the contents of the non-volatile memory comprises the substeps of:

sequentially reading out the contents of the non-volatile memory;

combining a first read-out sequence with a start sequence; and combining each successive read-out sequence with a result of a preceding combination, whereby a last combination represents the signature of the non-volatile memory.

11. The method according to claim 10, wherein each combining of sequences employs a Boolean function.

12. The method according to claim 10, wherein each combining of sequences comprises a step of shifting the sequences before or after the each combination.

13. The method according to claim 8, wherein step (a) of generating a signature from the contents of the non-volatile memory comprises the substep of:

adding values representing contents of respective memory cells in said non-volatile memory, thus forming a sum of values representing the signature of at least a part of the non-volatile memory.

14. The method according to claim 13, wherein the adding values representing contents in the non-volatile memories is executed in accordance with one of the following: row by row, line by line, from each respective word-line, or from respective odd and even addresses.

* * * * *